United States Patent
Helman

(10) Patent No.: US 6,879,723 B1
(45) Date of Patent: Apr. 12, 2005

(54) METHOD AND APPARATUS FOR ENCODING FRAMES OF IMAGE DATA AT A VARYING QUALITY LEVEL

(75) Inventor: Daniel Richard Helman, Vancouver, WA (US)

(73) Assignee: 8x8, Inc., Santa Clara, CA (US)

( * ) Notice: Subject to any disclaimer, the term of this patent is extended or adjusted under 35 U.S.C. 154(b) by 723 days.

(21) Appl. No.: 09/668,974

(22) Filed: Sep. 25, 2000

Related U.S. Application Data

(60) Provisional application No. 60/165,133, filed on Nov. 12, 1999.

(51) Int. Cl.[7] ............................. G06K 9/46; H02B 1/66
(52) U.S. Cl. .................................. 382/232; 375/240.03
(58) Field of Search ............................... 382/232–253; 375/240–240.2, 240.03, 240.24; 348/27

(56) References Cited

U.S. PATENT DOCUMENTS

| | | | | |
|---|---|---|---|---|
| 5,040,060 A | * | 8/1991 | Owada et al. ......... | 375/240.24 |
| 5,485,213 A | * | 1/1996 | Murashita et al. ..... | 375/240.12 |
| 5,543,844 A | * | 8/1996 | Mita et al. ............. | 375/240.2 |
| 6,084,912 A | * | 7/2000 | Reitmeier et al. ..... | 375/240.11 |
| 6,088,392 A | * | 7/2000 | Rosenberg ............. | 375/240.03 |
| 6,208,693 B1 | * | 3/2001 | Chen et al. ............ | 375/240.24 |
| 2003/0147462 A1 | * | 8/2003 | Maeda .................... | 375/240.1 |

* cited by examiner

*Primary Examiner*—Leo Boudreau
*Assistant Examiner*—Tom Y Lu

(57) ABSTRACT

A method and an apparatus are provided for encoding frames of image data. Selected blocks one frame in a sequence are encoded with one or more quantization levels in a first range, and selected other blocks in the one frame are bypassed. In a frame that follows the one frame, the blocks corresponding to the bypassed blocks are encoded with one or more quantization levels in a second range of quantization levels, and the other blocks are bypassed for encoding.

23 Claims, 5 Drawing Sheets

FIG.3A

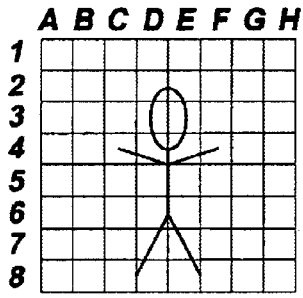

FRAME 0 (INITIAL FRAME)
SELECT INITIAL QUANTIZATION LEVEL
CODE ALL BLOCKS

FIG.3B

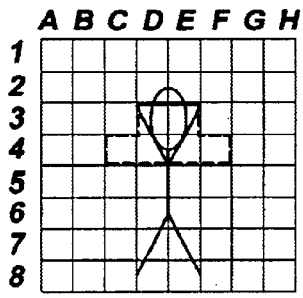

FRAME 1
SELECT QUANTIZATION RANGE FOR
CODING CHANGED BLOCKS
CODE THE CHANGED BLOCKS:
2D-E, 3D-E, 4C-F
SKIP THE OTHER BLOCKS AND
TRACK THE SKIPPED BLOCKS
SKIPPED BLOCKS = {1A-H, 2A-C, 2F-H,
 3A-C, 3F-H, 4A-B,
 4G-H, 5A-H, 6A-H,
 7A-H, 8A-H}

FIG.3C

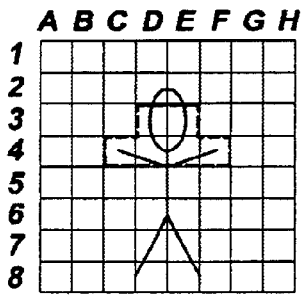

FRAME 2
SELECT QUANTIZATION RANGE FOR
CODING CHANGED BLOCKS
CODE THE CHANGED BLOCKS:
2D-E, 3D-E, 4C-4
SKIP THE OTHER BLOCKS AND
TRACK THE SKIPPED BLOCKS
SKIPPED BLOCKS = {1A-H, 2A-C, 2F-H,
 3A-C, 3F-H, 4A-B,
 4G-H, 5A-H, 6A-H,
 7A-H, 8A-H}

FIG.3D

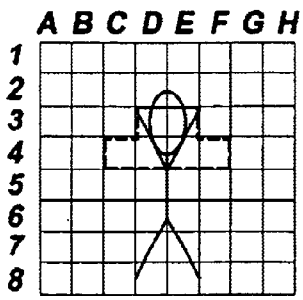

FRAME 3
SELECT QUANTIZATION RANGE FOR
CODING SKIPPED BLOCKS
CODE THE PREVIOUSLY SKIPPED BLOCKS:
 1A-H, 2A-C, 2F-H, 3A-C, 3F-H, 4A-B,
 4G-H, 5A-H, 6A-H, 7A-H, 8A-H

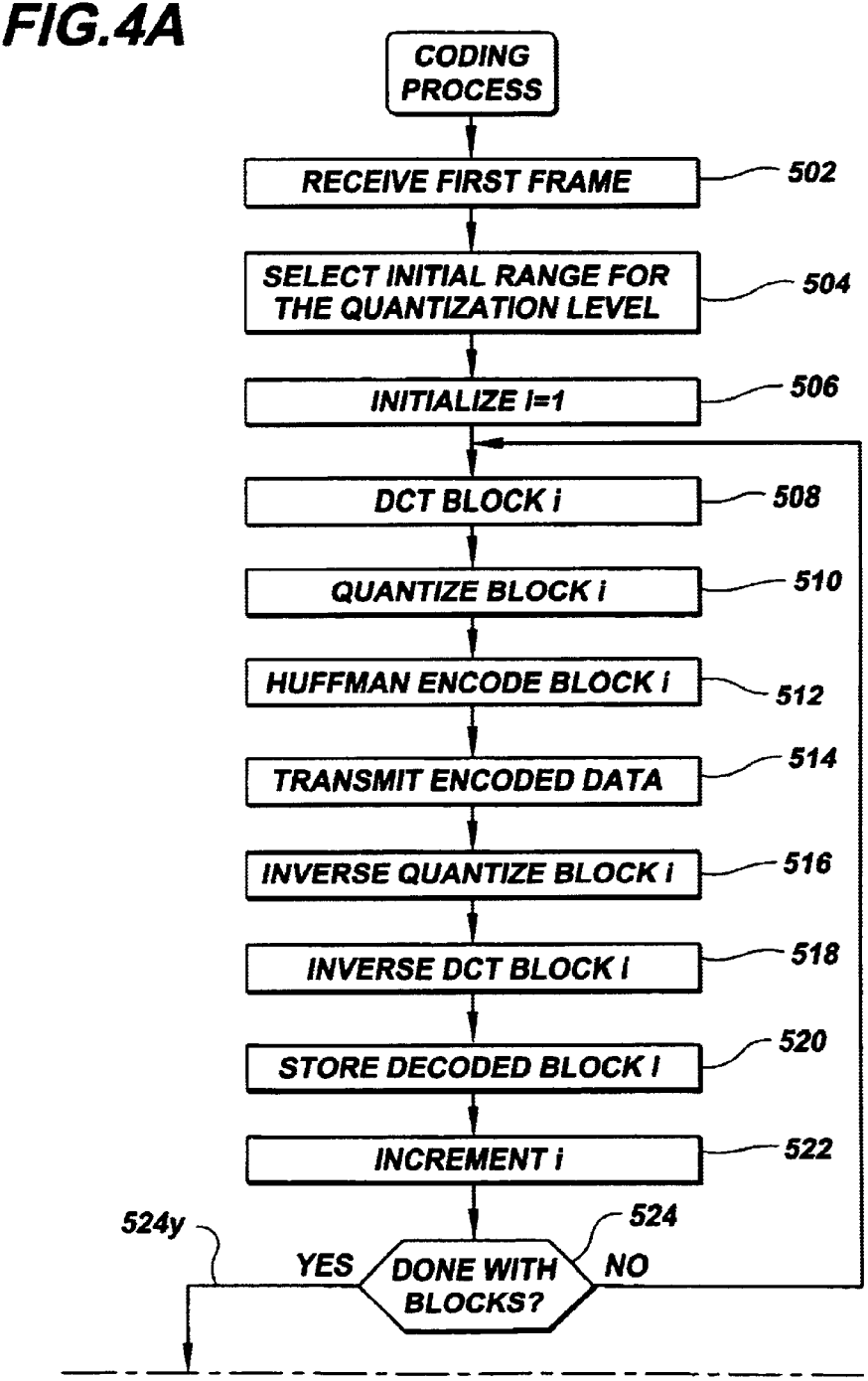

METHOD AND APPARATUS FOR ENCODING FRAMES OF IMAGE DATA AT A VARYING QUALITY LEVEL

RELATED PATENT DOCUMENTS

This application claims priority to and is a conversion of U.S. Provisional Application Ser. No. 60/165,133, filed on Nov. 12, 1999 (8X8S.219P1), entitled "Method Apparatus for Encoding Frames of Image Data at a Varying Quality Level".

FIELD OF THE INVENTION

The present invention generally relates to encoding image data, and more particularly, to a method and apparatus for encoding frames of image data at a varying quality level.

BACKGROUND OF THE INVENTION

Videoconferencing has enabled people to hold meetings without having to travel to a common location. As a result, meeting participants can be separated by large distances.

Typical videoconferencing applications use a video camera to capture a series of images of a target, such as a meeting participant or a document. The series of images is encoded as a data stream and transmitted over a communications channel to a remote location. For example, the data stream may be transmitted over a phone line, an integrated services digital network (ISDN) line, or the Internet. The encoding process is typically implemented using a digital video encoder/decoder (codec), which divides the images into macroblocks (or "blocks" for short) and compresses the blocks according to a video compression standard, such as the ITU-T H.263 and H.261 standards. In standards of this type, a block may be compressed independent of the previous image or as a difference between the block and part of the previous image.

Each block may be encoded or it may be skipped. If it is not encoded, the image used for that block during reconstruction is copied from the block at the same position in the previous reconstructed image.

When blocks are encoded, the process involves various methods and parameters. One parameter is the quantization level, Q, which influences the resolution of the decoded image. A low quantization level results in a relatively high resolution image encoded with a large number of bits, and a high quantization level results in a relatively low resolution image encoded with a smaller number of bits.

Some encoding techniques vary the quantization level from one block to the next block. However, in some applications it is more efficient to select a quantization level for a block that is the same as or close to the quantization level of the previous block. It may be costly or impossible to vary the quantization widely from block-to-block because of limited bandwidth, the need to maintain a desired frame-rate, and the unpredictability of the magnitudes of changes from frame to frame in the blocks. Therefore, it is common to use the same or slowly changing quantization level for all blocks in a frame. This produces reconstructed images with fairly uniform resolution across all blocks.

SUMMARY OF THE INVENTION

In connection with the present invention, it has been discovered that a greater image quality level can be realized by presenting a higher quality image in areas of the image that have little or no change and a lower quality image in areas of the image that are changing. Blocks in which the image is changing are encoded more frequently and can be encoded with a higher quantization level relative to the non-changing blocks.

Generally, the present invention provides methods and arrangements for encoding frames of image data. In one particular embodiment of the invention, a method comprises encoding selected blocks one frame in a sequence with one or more quantization levels in a first range, and bypassing selected other blocks in the one frame. In a frame that follows the one frame, the blocks corresponding to the bypassed blocks are encoded with one or more quantization levels in a second range of quantization levels, and the other blocks are bypassed for encoding.

In another embodiment the method comprises encoding with one or more levels from a first range of quantization levels selected ones of the blocks in a sequence of frames, wherein the selected ones of the blocks comprise a first subset of blocks. Blocks that are not members of the first subset of blocks are bypassing for encoding, wherein the blocks bypassed in encoding comprise a second subset of blocks. In a frame that follows the sequence of frames, blocks that correspond to the second subset of blocks are encoded with levels from a second range of quantization levels. Blocks of the frame that follows the sequence of frames that do not correspond to the second subset of blocks are bypassed for encoding.

In yet another embodiment, the method comprises encoding selected ones of the blocks in a sequence of frames at a first range of quality levels, wherein the selected ones of the blocks comprise a first subset of blocks, and bypassing encoding of blocks that are not members of the first subset of blocks, wherein the blocks bypassed in encoding comprise a second subset of blocks. In a frame that follows the sequence of frames, blocks that correspond to the second subset of blocks are encoded at a second range of quality levels, and blocks that do not correspond to the second subset of blocks are bypassed for encoding.

A method in yet another embodiment comprises encoding with one or more quantization levels in a first range of quantization levels selected portions of one segment of image data and bypassing encoding of portions of the one segment not selected for encoding. In another segment having image data that temporally follows image data of the one segment, portions that correspond to bypassed portions of the one segment are encoded with one or more quantization levels in a second range of quantization levels, and portions of the other segment that correspond to portions encoded in the one segment are bypassing for encoding.

In another embodiment, a system is provided for communicating frames of image data. The circuit arrangement comprises a memory, an encoder, a motion search element, and an encoding controller. The memory is arranged to store input frames segmented into blocks, and the encoder is coupled to the memory. The encoder is configured and arranged to selectably encode blocks from the memory at a selectable quality level, decode encoded blocks, and store encoded blocks. The motion search element is coupled to the memory and to the encoding circuit and is configured and arranged to detect image motion in input blocks relative to corresponding ones of the decoded, stored blocks. The encoding controller is coupled to the motion search element and to the encoding circuit and is configured and arranged to select between two or more quality levels for encoding blocks having moving image data and blocks having still image data, and bypass encoding of selected blocks for each of the quality levels.

BRIEF DESCRIPTION OF THE DRAWINGS

Various aspects and advantages of the present invention will become apparent upon reading the following detailed description of various embodiments and upon reference to the drawings in which:

FIGS. 3A–3D illustrate an example sequence of frames in which two ranges of quantization levels are used, and encoding and transmission of selected blocks are bypassed; and FIGS. 4A–4B illustrate an example embodiment of a method for encoding frames of video data using selected ranges of quantization levels.

Figure 1:
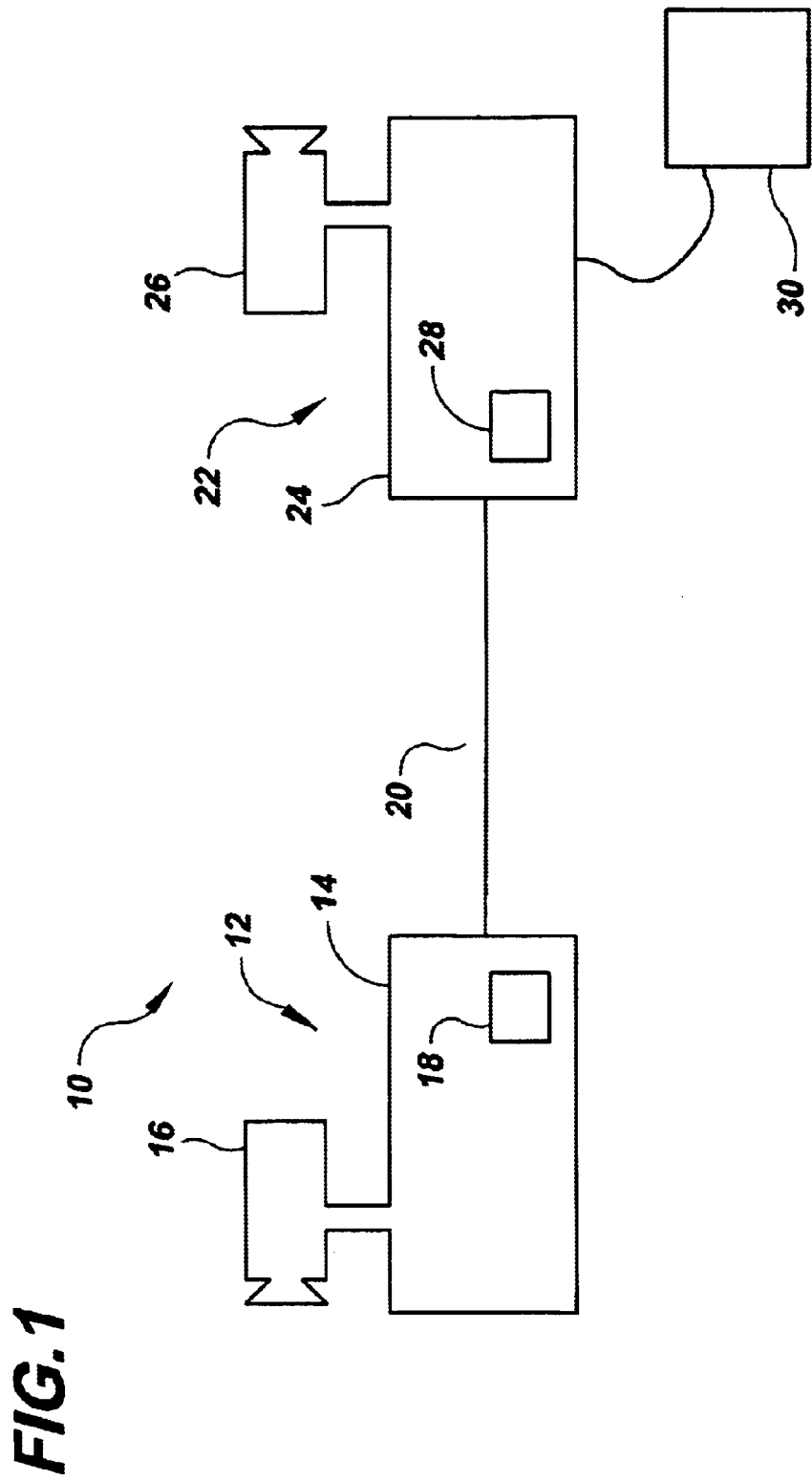
FIG. 1 illustrates a videoconferencing system implementing an embodiment of the present invention.

While the invention is amenable to various modifications and alternative forms, specifics thereof have been shown by way of example in the drawings and will be described in detail. It should be understood, however, that the intention is not to limit the invention to the particular embodiment described. On the contrary, the intent is to cover all modifications, equivalents, and alternatives falling within the spirit and scope of the invention as defined by the appended claims.

DETAILED DESCRIPTION

The present invention is believed to be applicable to a variety of systems and arrangements that transmit moving picture images. The present invention has been found to be particularly advantageous in video-monitoring and video-conferencing applications. Example product implementations finding use of the present invention include devices such as the ViaTV Set-Top Videophone, ViaTV Desktop Videophone, and the Remote Surveillance Module, each available from 8×8, Inc., of Santa Clara, Calif. While the present invention is not so limited, an appreciation of various aspects of the invention is thus gained through a discussion of various application examples operating in such environments.

It is assumed that it is more visually pleasing to present an image having a greater quality level, for example, a higher resolution, in areas of the image that have little or no change and a lower quality image in areas of the image that are changing. Thus for example, the background of an image will have blocks in which little or no motion is detected, and it may be desirable to encode these blocks with a higher resolution. Encoding the background blocks with a higher resolution does not need to be costly in terms of the number of bits since these background blocks do not have to be encoded frequently. That is, much of the time the background blocks can be skipped. Blocks in which the image is changing are encoded more frequently and can be encoded with a higher quantization level relative to the non-changing blocks.

FIG. 1 illustrates a videoconferencing system 10 particularly suited for use in connection with the present invention. A first videoconferencing station 12 typically includes a first terminal 14 that receives images from a camera 16. The images are processed by a codec in the terminal 14 and are transmitted over a communications channel 20. For example, the images may be transmitted over a telephone line, an ISDN line, an Internet channel, or a similar communications network. The images are then received by a second videoconferencing station 22, including a second terminal configured to be compatible with the first terminal. To facilitate the discussion below, the first and second terminals 14 and 24 are respectively referred to as local and remote terminals. It should be understood, however, that the features described can be incorporated into either or both terminals. The remote videoconferencing station 22 may further include a camera 26 and a codec 28. The remote videoconferencing station 22 receives the images over the communications channel 20 from the local videoconferencing station 12 and decodes them using the codec 28. The decoded images may be displayed on a display monitor 30. In this manner, meetings can be conducted, for example, with participants separated by long distances with all meeting participants able to see each other.

In order to transmit a still image quickly, the codec 18 initially compresses a still image as a relatively small data packet representing the still image at a relatively low resolution. The data packet is transmitted over the communications channel 20 in a relatively short period of time due to the small size of the data packet. The data packet is received by the remote videoconferencing station 22 and is decoded by the codec 28, and the relatively low resolution decoded image is displayed for viewing.

Figure 2:
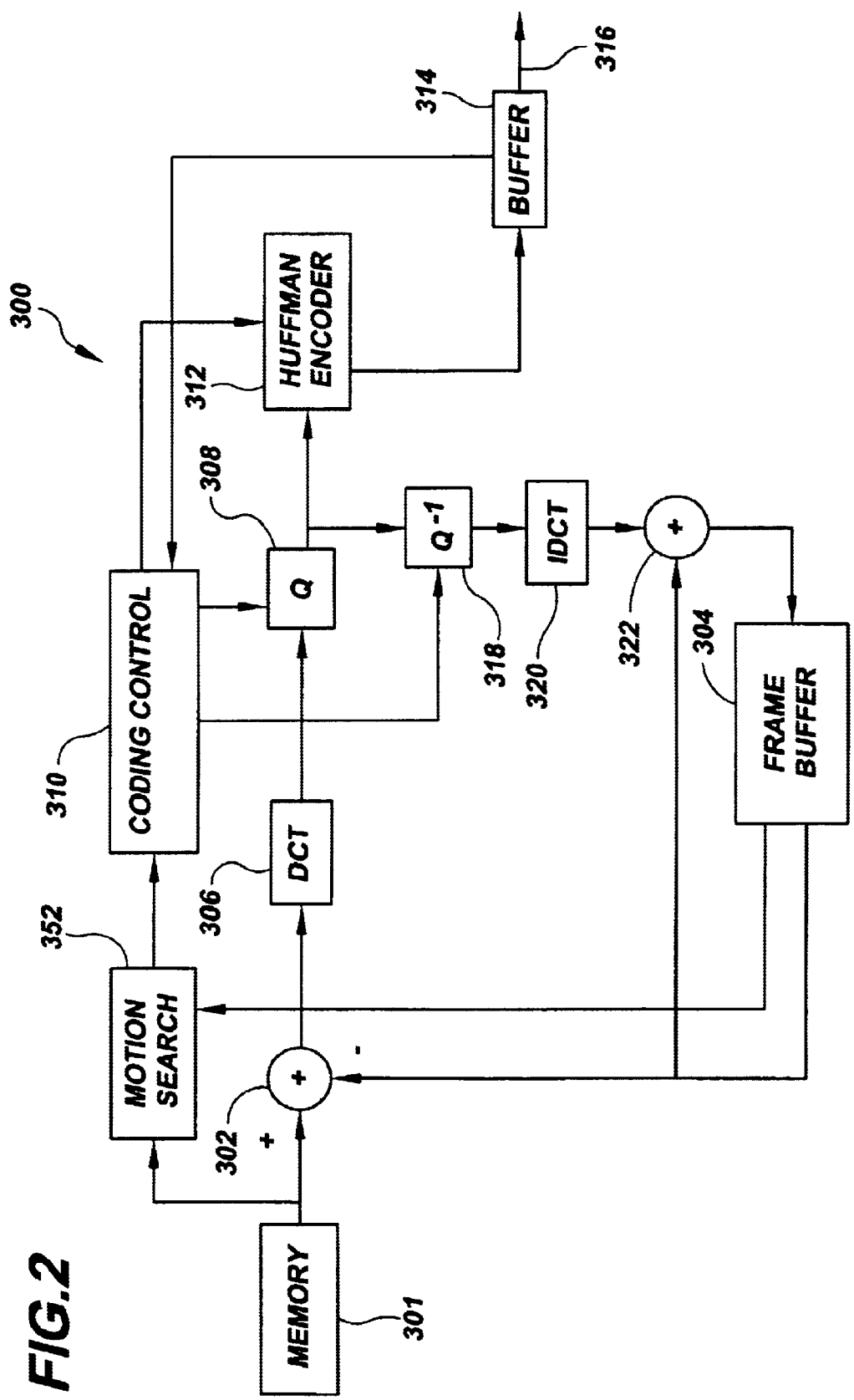
FIG. 2 illustrates in block diagram form an embodiment of an encoding arrangement according to the present invention.

FIG. 2 illustrates another embodiment of an encoding arrangement 300 that is particularly suited for use in the present invention. An original image is stored in a memory 301, such as a frame buffer. The original image is received by a summing element 302, which is configured and arranged to calculate different information representing the difference between the original image and an image stored in a memory 304, such as a frame buffer. When no image is initially stored in the memory 304, the original image is passed to a transformation block 306, which transforms the image into coefficient data selected from a continuous range of values. In the illustrated example, the transformation block 306 performs a discrete cosine transform (DCT) on the original image.

The coefficient data is further transformed by a transformation block, illustrated as a quantizer 308, which is controlled by a encoding control block 310. The quantizer 308 maps the coefficient data to a discrete set of values by dividing the continuous range of values into set of non-overlapping subranges. Each subrange is mapped to a single value, such that whenever a coefficient falls within a given subrange, the quantizer 308 generates the corresponding discrete value. The size of the subranges and the resolution of the quantization are controlled by the encoding control block 310.

The quantized data thus generated is encoded by an encoding block, illustrated as a Huffman encoder 312. For example, the quantized data may be encoded as a run length vector. The encoded data is stored in a memory 314 for transmission over a communications channel 316.

The quantized data is also received by a transformation block 318. The transformation block 318, implemented as an inverse quantizer in the illustrated example, maps the quantized data to a continuous range of values. The resolution of the inverse quantization is controlled by the encoding control block 310. A second transformation block 320 further transforms the quantized data using an inverse discrete cosine transform (IDCT) to reconstruct the image as it would be seen at a remote videoconferencing station. The reconstructed image is incorporated into the image previously stored in the memory 304 by a summing element 322, and the image thus produced is stored in the memory 304.

Encoding control block 310 and motion search block 352, in accordance with an example embodiment of the invention, control the process of selecting which blocks are encoded from frame-to-frame and selecting a range of quantization levels from which a particular quantization level is selected. Rather than using the same or a slowly changing quantization level for an entire frame, it may be more visually pleasing to present an image having a greater quality level, for example, a higher resolution, in areas of the image that have little or no change. For example, the background of an image will have blocks in which little or no motion is detected, and it may be desirable to encode these blocks less frequently and at a higher resolution. Encoding the background blocks with a higher resolution does not need to be costly in terms of the number of bits since these background blocks do not have to be encoded frequently. That is, much of the time the background blocks can be skipped.

Thus, in the example embodiment, encoding control block 310 selects between two ranges of quantization levels prior to encoding a frame. More than two ranges of quantization levels could be used in other embodiments. One range may be suitable for encoding the background at a higher resolution, and the other range may be suitable for encoding the foreground or portions of the image having moving imagery at a lower resolution. When encoding the blocks in a particular frame, the selected quantization level (s) is confined to the range selected for that frame.

In an example embodiment, the ranges of quantization levels is varied by, for example, encoding a first predetermined number of frames with quantization levels in the first range, encoding a subsequent frame with quantization levels in the second range, encoding the next predetermined number of frames with quantization levels in the first range, encoding the next frame with quantization levels in the second range, and so on. Specifically, the first three frames are encoded with a quantization levels in a higher range, the next frame is encoded with quantization levels in a lower range, the next three frames are encoded with quantization levels in the higher range, the next frame is encoded with quantization levels in the lower range and so on. In an alternative embodiment, the process for selecting ranges of quantization levels may track the number bits used to encode a sequences of frames, and when the number of bits exceeds a threshold, the range of quantization levels is changed for the next frame. In still another embodiment, ranges of quantization levels may be alternated based on the passage of time.

Motion search block 352 receives as input a block from memory 301 and the corresponding previously transmitted block from frame buffer 304. Using conventional techniques, motion search block 352 determines the extent to which the block from memory 301 has changed relative to the corresponding previously transmitted block. The extent of change is provided as input to encoding control block 310.

Encoding control block 310 controls the selection of the range of quantization levels, selection of the quantization level within the range, and which blocks of a frame are encoded and transmitted. If, for example, a first range of quantization levels is used for encoding moving imagery in a frame, and a second range of quantization levels is used for encoding background imagery in a frame, the encoding control block 310 skips encoding blocks having the background image while encoding frames having blocks with moving imagery. When encoding using the first range of quantization levels, only those blocks in which the motion of the image exceeds a selected threshold are encoded.

The blocks skipped while encoding the moving imagery are neither encoded nor transmitted. Thus, encoding control block 310 controls the quantization block 308, inverse-quantization block 318, and Huffman encoder 312 to prevent the quantization and encoding and transmission of the skipped blocks. While not shown, it will be appreciated that frame buffer 304 is not updated with the data for the skipped blocks.

After encoding the blocks having moving imagery for a sequence of frames, the encoding control block 310 switches in a subsequent frame to encoding the blocks (at quantization levels in another range of levels) that were skipped (the background blocks) in the prior sequence of frames. Thus, while encoding the background blocks, quantization and encoding are bypassed for the blocks of the previous frame that had moving imagery.

The encoding arrangement 300 of FIG. 2 can be implemented using any of a variety of processor arrangements, including the arrangements disclosed in connection with U.S. Pat. application Ser. Nos. 08/692,993, now U.S. Pat. No. 5,901,248 and 08/658,917, respectively entitled and relating to issued patents also entitled "Programmable Architecture and Methods for Motion Estimation" (U.S. Pat. No. 5,594,813) and "Video Compression and Decompression Processing and Processors" (U.S. Pat No. 5,379,351), and also in connection with application Ser. No. 09/095,448 entitled "Videocommunicating Device with an On-screen Telephone Keypad User-Interface Method and Arrangement." These applications and issued patents are incorporated herein by reference. Such processor arrangements are based on a multi-processor chip having uniquely arranged RISC and DSP type processors, which can be selectively loaded with program code for decoding and encoding video data of various formats. In yet another embodiment, the encoding arrangement may be implemented with ASICs.

FIGS. 3A–3D illustrate an example sequence of frames in which two ranges of quantization levels are used, and encoding and transmission of selected blocks are bypassed. Frame 0 is presented in FIG. 3A, frame 1 is presented in FIG. 3B, frame 2 is presented in FIG. 3C, and frame 3 is presented in FIG. 3D.

Frame 0 represents an initial frame to be encoded, for example, when an encoding arrangement is first started. The initial frame is encoded using an initial quantization level, or range of levels, for the entire frame. Thus, all the blocks of frame 0 are encoded in beginning operations. For frames that follow the initial frame, the encoding arrangement selects one of a plurality of ranges of quantization levels for encoding and also selectively bypasses encoding of certain blocks. In the example sequence of frames, a first quantization range for encoding changed blocks (e.g., those with moving imagery) is selected for frames 1 and 2. A second quantization range for encoding the skipped blocks (those bypassed in frames 1 and 2) is selected for frame 3. The pattern for selecting quantization ranges can then be repeated for frames that follow frame 3.

When the encoding arrangement receives the second example frame (frame 1 of FIG. 3B), a range of quantization levels for encoding changed blocks is selected. Note that the blocks of the frames are referenced by rows designated with integers 1–8 and columns designated with letters A–H. In processing the blocks of frame 1, the blocks that changed include 2D–2E, 3D–3E, and 4C–4F, and a dashed line surrounds the blocks detected as having changed. In accordance with the example embodiment, only the changed blocks are encoded using the first selected range of quantization levels, and encoding is bypassed for the blocks for which no change is detected. The bypassed blocks are tracked from frame-to-frame to indicate which blocks to encode when a new quantization range is selected.

In receiving the third example frame (frame 2 of FIG. 3C), again the first range of quantization levels is selected for encoding changed blocks, and the blocks detected as having changed are those surrounded by the dashed line. Thus, the changed blocks are encoded with the levels in the first range, and the other blocks are bypassed.

In frame 3 of FIG. 3D, the second quantization range is selected for encoding the skipped blocks. Thus, even though the blocks surrounded by the dashed line are detected as having changed, the blocks that were skipped in frame 2 are encoded in frame 3 with quantization levels in the second range. The changed blocks of frame 3 are not encoded. In an example embodiment, when frame 4 is received, the first quantization range is selected for encoding changed blocks, and the sequence of selecting quantization ranges and skipping selected blocks is repeated.

Figure 4B:
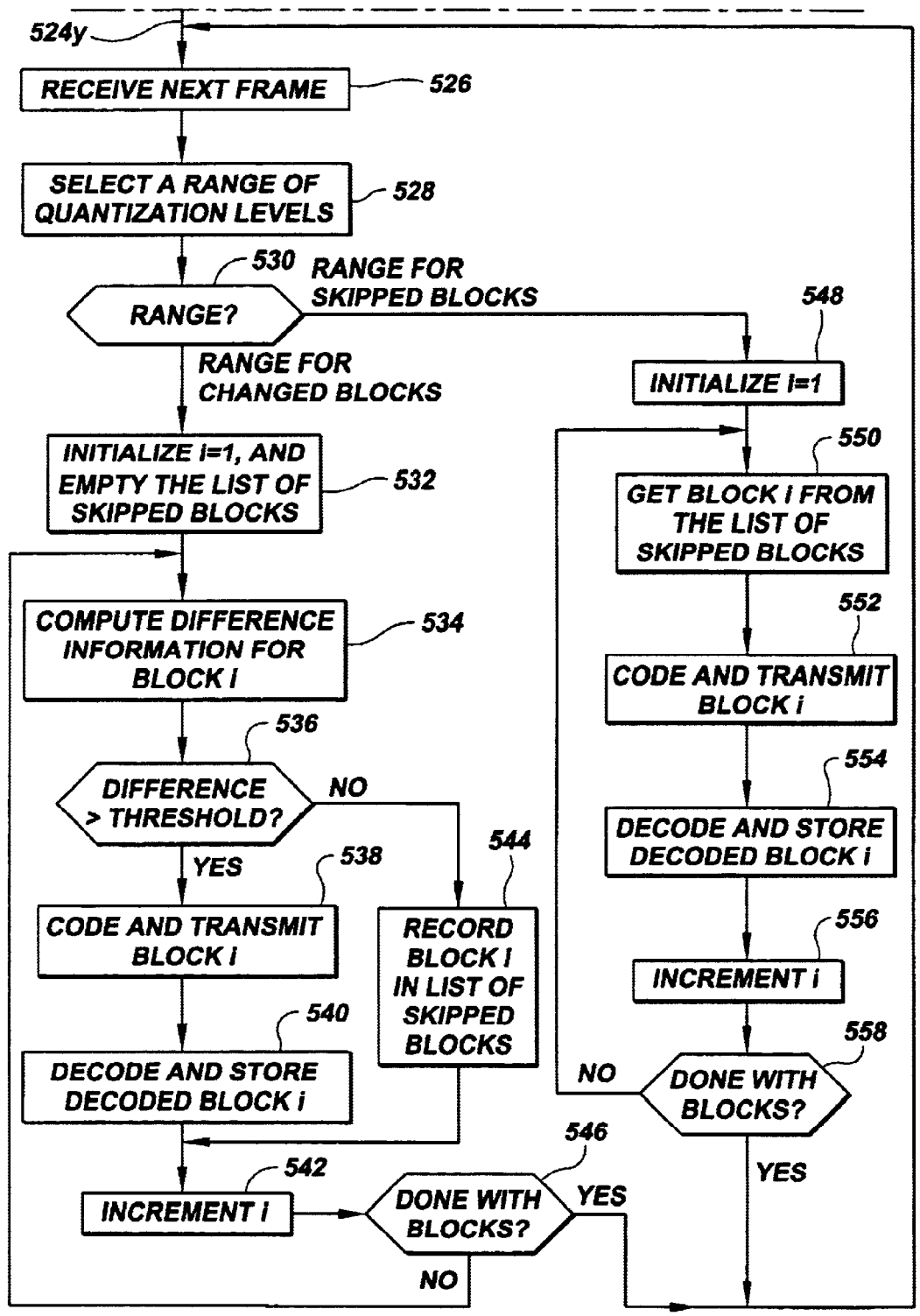

FIGS. 4A–4B illustrate an example embodiment of a method for encoding frames of video data using selected ranges of quantization levels. At step 502 a first frame is received for encoding, and an initial range of quantization levels is selected at step 504. The selected quantization range may be selected to accommodate a desired resolution and available bandwidth for the initial frame, considering that all blocks are encoded and transmitted for the initial frame.

Each block is transformed at step 508 according to a discrete cosine transform (DCT) to obtain a coefficient vector comprising a coefficient for each pixel of the block. Assuming the image is divided into 8×8 blocks of pixels, for example, the coefficient vector comprises sixty-four coefficients. The coefficients may vary over a continuous range of values. At step 510, each coefficient is quantized to one of a discrete set of values by dividing the continuous range of values into a set of non-overlapping subranges. Each subrange is mapped to a single value, such that whenever a coefficient falls within a given subrange, a corresponding discrete is generated. The size of the subranges is determined by the quantization parameter QP. Larger values of QP produce larger subranges and coarser quantization. Conversely, smaller values of QP produce smaller subranges and finer quantization. Accordingly, an initial quantization parameter QP can be set to a relatively large value. For example, QP may be initially set to a value of 31. Some applications, however, benefit from a lower initial value of the quantization parameter QP. For example, an image may have already been transmitted and received with a resolution corresponding to a lower value of the quantization parameter QP.

The quantized data thus generated at step 510 is encoded at step 512 into a set of encoded data. For example, the quantized data may be Huffman encoded by the Huffman encoder 312 as a run length vector. The set of encoded data is transmitted at step 514 over the communications channel.

The set of encoded data is also inverse quantized at step 516 and transformed according to an inverse discrete cosine transform (IDCT) at step 518 to reconstruct a block as seen by a viewer at a remote videoconferencing station. Because this reconstruction is based on quantized data, the reconstructed block has a lower resolution than the original block.

When all the blocks in the initial frame have been encoded and transmitted, decision step 524 directs control to step 526 of FIG. 4B where the next frame is received. Step 528 selects a range of quantization levels based on whether blocks having changed imagery are to be encoded or whether blocks having generally still imagery are to be encoded. Recall that blocks having changing imagery, in accordance with an example embodiment, are encoded using a higher range of quantization levels and are encoded more frequently, relative to blocks having unchanging imagery.

Various methods can be used at step 528 to select a particular quantization range. For example, the quantization ranges may be alternated by counting the number of frames encoded with each of the quantization ranges and switching the range after encoding a selected number of frames. In an alternative embodiment, the process for selecting ranges of quantization levels may track the number bits used to encode a sequences of frames, and when the number of bits exceeds a threshold, the quantization range is changed for the next frame. In still another embodiment, quantization ranges may be alternated based on the passage of time.

Decision step 530 tests which quantization range was selected at step 528. The example embodiment includes two quantization ranges: one for encoding changed blocks and the other for encoding unchanged blocks (the "skipped" blocks). Processing is directed to step 532 of the selected quantization range is for encoding changed blocks. At step 532, a loop counter is initialized and the list of skipped blocks is emptied.

At step 534, difference information is computed for block i relative to the previously transmitted corresponding block. If the difference is greater than a selected threshold, decision step 536 directs control to step 538 where the block is encoded and transmitted. It will be appreciated that the encoding and transmission can be accomplished in a manner similar to that described in steps 508–520 of FIG. 4A. The particular quantization level that is selected within a range can be varied according to conventional techniques. The encoded block is then decoded and stored at step 540, and step 542 increments i.

If the difference information for the block does not exceed the selected threshold, decision step 536 directs control to step 544 where the block is recorded in the list of skipped blocks. Control is then directed to step 542 to increment i to reference the next block to process. Note that encoding and transmission of the block is bypassed along this path.

Decision step 546 repeats the encoding of changed blocks until all the blocks in the frame have been processed. When all the blocks have been processed, control is returned to step 526 to receive the next frame and step 528 to select the next quantization range.

If the quantization range for skipped blocks is selected, control is directed to step to initialize the block counter to reference the first block in the list of skipped blocks and to step 550 to get block i from the list of skipped blocks. At step 552, the block is encoded and transmitted using a quantization level selected from the quantization range for skipped blocks. The particular quantization level can be selected using conventional methods. Step 554 decodes and stores the decoded block, and the block counter is incremented at step 556. Once all the skipped blocks have been processed, decision step 558 returns control to step 526 to get the next frame.

While example embodiments have been described with reference to two ranges of quantization levels, it will be appreciated that more than two ranges could be used in other embodiments. In addition, while the embodiments have been described in terms of "frames" and "blocks" of image data, those skilled in the art will appreciate that the invention could be applied to other schemes for organizing image data.

The various embodiments described above are provided by way of illustration only and should not be construed to limit the invention. Those skilled in the art will readily recognize various modifications and changes which may be made to the present invention without strictly following the exemplary embodiments and applications illustrated and described herein, and without departing from the true spirit and scope of the present invention which is set forth in the following claims.

What is claimed is:

1. A method for encoding frames of image data, each frame including a plurality of blocks, comprising:
   encoding with one or more quantization levels in a first range of quantization levels selected blocks of one frame in the sequence;
   bypassing encoding of blocks of the one frame not selected for encoding;
   encoding with one or more quantization levels in a second range of quantization levels in another frame that follows the one frame, blocks that correspond to blocks bypassed for encoding in the one frame; and
   bypassing encoding of blocks of the other frame that correspond to the selected blocks of the one frame.

2. The method of claim 1, wherein the selected blocks in the one frame include blocks having one or more levels that exceed a selected threshold.

3. The method of claim 2, wherein the first range of quantization levels has levels greater than levels of the second range of quantization levels.

4. The method of claim 1, wherein the data comprises moving picture data, the selected blocks in the one frame include blocks having data representing a picture in which motion is detected, and the blocks of the one frame bypassed for encoding have data representing a picture in which no motion is detected.

5. The method of claim 4, wherein levels in the first range are greater than levels in the second range.

6. A method for encoding frames of image data, each frame including a plurality of blocks, comprising:
   encoding with one or more levels from a first range of quantization levels selected ones of the blocks in a sequence of frames, wherein the selected ones of the blocks comprise a first subset of blocks;
   bypassing encoding of blocks that are not members of the first subset of blocks, wherein the blocks bypassed in encoding comprise a second subset of blocks;
   encoding with levels from a second range of quantization levels in a frame that follows the sequence of frames, blocks that correspond to the second subset of blocks; and
   bypassing encoding of blocks of the frame that follows the sequence of frames that do not correspond to the second subset of blocks.

7. The method of claim 6, wherein the first subset of blocks is comprised of blocks having one or more levels that exceed a selected threshold.

8. The method of claim 6, wherein the data comprises moving picture data, the first subset of blocks have data representing a picture in which motion is detected, and the second subset of blocks have data representing a picture in which no motion is detected.

9. The method of claim 8, wherein levels in the first range of quantization levels are greater than levels in the second range of quantization levels.

10. The method of claim 6, further comprising terminating encoding the sequence of frames with levels of the first range after a predetermined number of frames.

11. The method of claim 10, further comprising alternating between encoding a sequence of frames using the first range and bypassing blocks in the sequence of frames, and encoding a frame using the second range and bypassing blocks that do not correspond to the second subset of blocks.

12. The method of claim 6, further comprising terminating encoding the sequence of frames using the first range after a predetermined period of time.

13. The method of claim 12, further comprising alternating between encoding a sequence of using the first range and bypassing blocks in the sequence of frames, and encoding a frame using the second range and bypassing blocks that do not correspond to the second subset of blocks.

14. The method of claim 6, further comprising:
   counting bits output in encoding the sequence of frames using the first range as a total number of bits;
   terminating the sequence of frames encoded using the first range after the total number of bits exceeds a predetermined threshold.

15. The method of claim 14, further comprising alternating between encoding a sequence of frames using the first range and bypassing blocks in the sequence of frames, and encoding a frame using the second range and bypassing blocks that do not correspond to the second subset of blocks.

16. A method for encoding frames of image data, each frame including a plurality of blocks, comprising:
   encoding selected ones of the blocks in a sequence of frames at a first range of quality levels, wherein the selected ones of the blocks comprise a first subset of blocks;
   bypassing encoding of blocks that are not members of the first subset of blocks, wherein the blocks bypassed in encoding comprise a second subset of blocks;
   encoding at a second range of quality levels in a frame that follows the sequence of frames, blocks that correspond to the second subset of blocks; and
   bypassing encoding of blocks of the frame that follows the sequence of frames that do not correspond to the second subset of blocks.

17. The method of claim 16, wherein the first range of quality levels is less than the second range of quality levels.

18. The method of claim 17, wherein the first subset of blocks is comprised of blocks having one or more levels that exceed a selected threshold.

19. The method of claim 17, wherein the data comprises moving picture data, the first subset of blocks have data representing a picture in which motion is detected, and the second subset of blocks have data representing a picture in which no motion is detected.

20. An apparatus for encoding frames of image data, each frame including a plurality of blocks, comprising:
   means for encoding with one or more quantization levels in a first range of quantization levels a first subset of blocks of one frame in the sequence;
   means for bypassing encoding of blocks of the one frame that are not in the first subset of encoded blocks, wherein the blocks bypassed in encoding comprise a second subset;
   means for encoding with one or more quantization levels in a second range of quantization levels in another frame that follows the one frame, blocks that correspond to the second subset of blocks of the one frame; and means for bypassing encoding of blocks of the other frame that do not correspond to the second subset of blocks of the one frame.

21. A method for encoding image data, comprising:

encoding with one or more quantization levels in a first range of quantization levels selected portions of one segment of image data;

bypassing encoding of portions of the one segment not selected for encoding;

encoding with one or more quantization levels in a second range of quantization levels in another segment having image data that temporally follows image data of the one segment, portions that correspond to bypassed portions of the one segment; and bypassing encoding of portions of the other segment that correspond to portions encoded in the one segment.

22. The method of claim 21, wherein the selected portions in the one frame have levels of change that exceed a selected threshold.

23. The method of claim 22, wherein the first range of quantization levels has levels greater than levels of the second range of quantization levels.

* * * * *